No. 867,065. PATENTED SEPT. 24, 1907.
L. C. MARBURG.
SYSTEM OF ELECTRICAL DISTRIBUTION.
APPLICATION FILED AUG. 30, 1905.
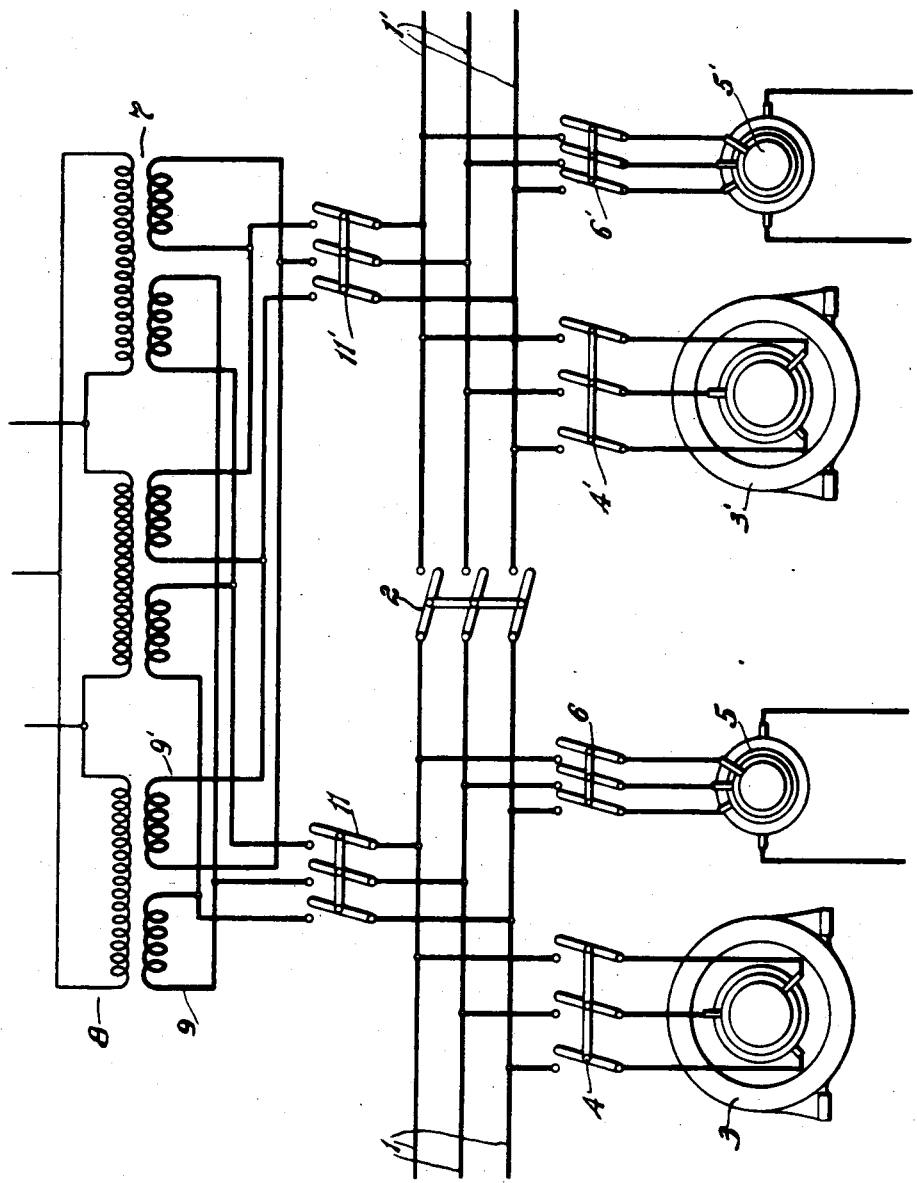
Witnesses:
George J. Schwartz
Fred J. Kinsey
Inventor:
Louis C. Marburg.
By
Chas E. Lord
Attorney.

UNITED STATES PATENT OFFICE.

LOUIS C. MARBURG, OF NORWOOD, OHIO, ASSIGNOR TO THE BULLOCK ELECTRIC MANUFACTURING COMPANY, A CORPORATION OF OHIO.

SYSTEM OF ELECTRICAL DISTRIBUTION.

No. 867,065.  Specification of Letters Patent.  Patented Sept. 24, 1907.

Application filed August 30, 1905. Serial No. 276,332.

*To all whom it may concern:*

Be it known that I, LOUIS C. MARBURG, a citizen of the United States, residing at Norwood, in the county of Hamilton and State of Ohio, have invented certain new and useful Improvements in Systems of Electrical Distribution, of which the following is a full, clear, and exact specification.

This invention relates to a system of electrical distribution in which energy in the form of alternating current is transformed into direct current by means of a single or a plurality of converters.

It has been found that when two or more converters are conductively connected together on both the alternating and direct current sides, as when converters in a main power station or in a sub-station nearby are connected directly to the low-tension bus-bars in the power station, the converters do not operate satisfactorily, probably on account of the cross currents flowing through the short circuit including the converters and the connecting leads on the alternating and direct current sides.

One of the objects of my invention is to provide a means for operating two or more converters in the power station, or a nearby sub-station, directly from the low-tension bus-bars in the power station, without necessitating the use of both step-up and step-down transformers, which involve considerable expense, and without otherwise conductively connecting the converters on the alternating current side.

A further object is to provide a convenient means for connecting one or more converters to an alternating current system.

In carrying out my invention, I provide a transformer having a high-tension winding, and a plurality of independent low-tension windings adapted to be connected to the bus-bars or the converters. The converters may be supplied with current directly by the generators or one or more may be connected to low-tension windings and supplied with current by induction from one or more low-tension windings which are connected to the bus-bars and to one or more generators.

Considering my invention from a more specific standpoint, I provide bus-bars sectionalized by means of switches, or a plurality of independent sets of bus-bars, a plurality of generators, a plurality of rotary converters, and a transformer having a high-tension winding and a plurality of low-tension windings, each generator, converter, and low-tension winding being provided with switches whereby I may connect each set or section of bus-bars to one or more generators, to a converter, and to a low-tension winding, or I may connect one, two, or all the generators to a set or section of bus-bars to which a low-tension winding is connected, and connect another low-tension winding to a converter.

My invention further consists in certain novel arrangements and combinations of parts described in the specification and set forth in the appended claims.

Referring to the drawing, which represents diagrammatically a system of distribution involving my invention, I have shown at 1, 1' two independent sets or sections of low-tension bus-bars, adapted to be connected, if desired, by the switch 2, the bus-bars being fed in this case by the three-phase generators 3 and 3'.
Switches 4 and 4' are inserted between the generators and the corresponding bus-bars for connecting or disconnecting, one or more generators at will. At 5 and 5' are shown two rotary converters which are intended to be located in a power station or a nearby sub-station and to be connected to the alternating current generators and to the direct current mains. Between each converter and the corresponding bus-bars are suitable switches 6 and 6' for connecting or disconnecting at will any one of the converters. I have shown at 7 a three-phase step-up transformer, the high tension side 8 of which is adapted to be connected to a transmission or feeder circuit. The low-tension side of this transformer consists of two or more entirely independent windings 9 and 9' adapted to be connected respectively by switches 11 and 11' to the sections or sets of the bus-bars. As I have in this case shown only two sets of bus-bars, I have shown only two independent low-tension windings, but it is to be understood that if more than two sets of bus-bars are used, there would preferably be a corresponding number of independent low tension windings, each adapted to be connected to one set of bus-bars.

The manner of connecting the various parts of the apparatus under different conditions of load and the results obtained will now be explained. If it is desired to operate both generators and both converters, the switches 4, 4' and 6, 6' will be closed and the sectionalizing switch 2 will be opened. It will be seen that each generator will supply one converter and at the same time supply one-half of the low-tension side of the transformer 7. If for any reason it is desired to operate one generator and two converters, one generator switch, both converter switches and both transformer switches will be closed, but the bus-sectionalizing switch 2 will be opened. In this case one converter will be supplied through the two low-tension windings of the transformer, the two windings acting in this case as a one-to-one ratio transformer. If it is desired to operate converter 5' from generator 3, converter 5 being shut down, the bus-sectionalizing switch 2 will be closed and converter 5' will be supplied direct from the generator 3. In a similar manner converter 5 can be fed direct from generator 3'. It is to be noted in the two latter cases that there is no transformer between the generator and converter. If it is desired to operate either converter from both generators, the bus-sectionalizing switch will be closed.

It will be seen that the generators and converters can be connected in a variety of ways for various purposes and conditions of load, and in no case will the converters be conductively connected together on both the alternating current and direct current sides, therefore there will be no closed electric circuit for the objectional cross-currents. I have shown in this case two generators and two converters, and I have explained how each converter can be operated directly from a separate generator, or both from a single generator, one being connected direct to the generator and the other to the generator through the low-tension transformer windings. I wish it understood however, that the number of generators and converters employed may be widely varied. I have shown in this case rotary converters, but it is apparent that my invention can be employed with equal effect with converters of any other type which have alternating and direct current terminals conductively connected together.

Having thus described my invention, what I claim as new and desire to secure by Letters Patent is—

1. In a system of distribution, a plurality of low-tension bus-bars, a source of alternating current comprising generators adapted to be connected to said bus-bars, a transformer having separate windings connected to said bus-bars, a plurality of converters, and means for connecting the converters to the source of current in such a manner that the converters are not conductively connected together on the alternating current side.

2. In a system of distribution, a plurality of low-tension bus-bars or alternating current connections, a plurality of generators adapted to be connected to or disconnected therefrom at will, a transformer having a plurality of separate low-tension windings connected to said bus-bars or connections, a plurality of converters, and means for connecting said converters to said bus-bars or connections in such a manner that the converters are not conductively connected together on the alternating current side.

3. In a system of distribution, an alternating current generator, a transformer having a high-tension winding and a plurality of low-tension windings, means for connecting the generator to one of said low-tension windings, a converter, and means for connecting the converter to another of said low-tension windings.

4. In a system of distribution, one or more alternating current generators, a transformer having a plurality of low-tension windings, means for connecting the generator or generators to one of said low-tension windings, one or more converters, and means for connecting a converter to another low-tension winding.

5. In a system of distribution, a source of alternating current, a transformer having a high-tension winding and a plurality of independent low-tension windings, a plurality of converters, and means for connecting the source of current to one of said low-tension windings and to a converter, and a second converter to a second low-tension winding.

6. In a system of distribution, a source of alternating current, a step-up transformer having a high-tension winding and a pair of low-tension windings, a pair of converters, means for connecting the source of current to one of said low-tension windings and to one of said converters and means for connecting the second of said converters to another of the low-tension windings.

7. In a system of distribution, a plurality of independent alternating current generators, a transformer having a high-tension winding and a plurality of low-tension windings, means for connecting each of said generators to one of said low-tension windings, a plurality of converters, and means for connecting each of said converters to one of said generators.

8. In a system of distribution, a plurality of alternating current generators, each adapted to be connected independently to a section or set of sectionalized bus-bars, a transformer having a high-tension winding and a plurality of independent low-tension windings, a plurality of converters, means for connecting one set of bus-bars to one or more generators, to one low-tension winding and to one converter, and means for connecting another set of bus-bars to another low-tension winding and to another converter.

9. In a system of distribution, a plurality of alternating current generators, a transformer having a high-tension winding, and a plurality of low-tension windings, a plurality of converters and means for connecting one or more generators to each of said low-tension windings and to one of said converters.

10. In a system of distribution, a plurality of alternating current genrators, a transformer having a plurality of low-tension windings, a plurality of converters, means for connecting a generator to each low-tension winding and to a converter, or for disconnecting the generator from a low-tension winding and for connecting a converter only to said winding, so that the converters are not conductively connected together on the alternating current side.

In testimony whereof I affix my signature, in the presence of two witnesses.

LOUIS C. MARBURG.

Witnesses:
ARTHUR F. KWIS,
FRED J. KINSEY.